G. S. GARREN.
GASKET.
APPLICATION FILED OCT. 26, 1918.
1,339,599.
Patented May 11, 1920.
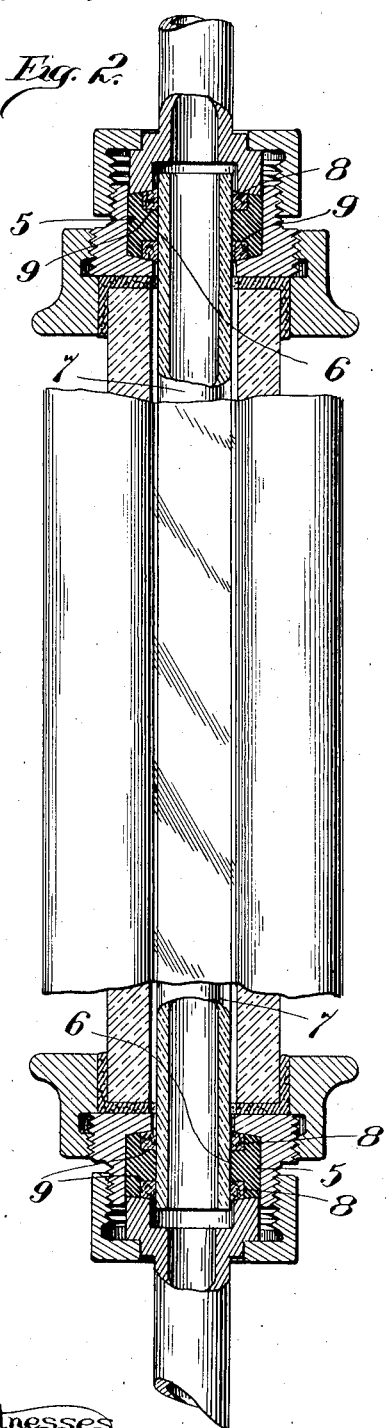
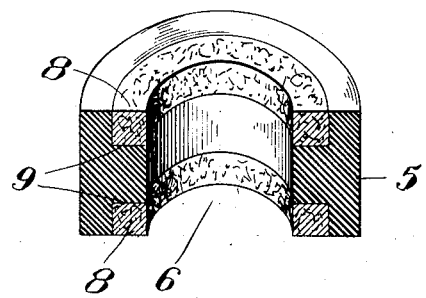
Witnesses
Milton Lenoir
F. O. Horell
Inventor
George S. Garren
Neidman Street
Attorneys

UNITED STATES PATENT OFFICE.

GEORGE S. GARREN, OF OAK PARK, ILLINOIS, ASSIGNOR TO SARGENT COMPANY, OF CHICAGO, ILLINOIS, A CORPORATION OF ILLINOIS.

GASKET.

1,339,599.  Specification of Letters Patent.  Patented May 11, 1920.

Application filed October 26, 1918. Serial No. 259,823.

*To all whom it may concern:*

Be it known that I, GEORGE S. GARREN, a citizen of the United States, and a resident of Oak Park, in the county of Cook and State of Illinois, have invented certain new and useful Improvements in Gaskets, of which the following is a description, reference being had to the accompanying drawing, which forms a part of my specification.

My invention relates to gaskets or washers whereby suitable fluid-tight connections may be effected; the gaskets being especially adapted for use in connection with water-gage glasses employed on steam boilers, where the gaskets or washers are intended to be in intimate relation with the water-glass or tube so as to provide a steam-tight connection and at the same time act as a means of support for the ends of the water-glass in the casing and stuffing-box connections of the gage.

The object of my invention is to provide a gasket which will possess the requisite resiliency, to adapt it to the variations that exist in the water-tubes or glasses of the gage, and at the same time to eliminate the difficulties heretofore encountered through the excessive heating of the gasket when employed in such connection with water-gages.

My invention is adapted to overcome the serious difficulties which have been encountered with water-gages provided with the usual or ordinary rubber gasket; the difficulties resulting from the heat and pressure to which the gasket is subjected, which causes the rubber gasket to become soft and therefore lose its tenacity and due to the pressure exerted thereon by the packing nut, the rubber gasket also becomes displaced. It has been found in practice that the rubber gaskets heretofore employed, as a result of their intimate relation with the heated water-glass or tube and especially at the end of the tube or steam end of the gage, have been so affected that the rubber has been induced, especially where it contacts with the steam and hot water, to pass along the glass-tube in opposite directions, more especially toward the glass-tube end, through the clearance which must necessarily be provided in the stuffing-box connections. As a result of such action, the gasket not only loses its life and content, so that its life is shortened by leakage, but the displaced portion of the rubber gasket in many instances has been caused to flow toward the end of the water-glass or tube and completely seal the ends thereof. This action necessarily interfered with the proper circulation of the water through the water-glass or tube, and as can readily be comprehended, has resulted in an improper water-level reading or showing in the gage, and thus permitting a dangerous condition to exist because of the false water-level showing in the gage. For example, the stoppage of the water-tube or glass, through the accumulation of the molten rubber at the ends of the water-tube, has resulted in a water-level being maintained in the water-gage out of keeping with or contrary to the actual water-level in the boiler; the water, in reality, being at such level or point in the boiler that the crown-sheet of the boiler is left uncovered and therefore subject to damage or burning, thereby producing a dangerous condition which would result in the bursting or blowing up of the boiler.

The object of my invention is to provide a gasket or washer adapted to absolutely eliminate these difficulties and yet at the same time retain the requisite qualities of gaskets as heretofore employed; and to this end I provide a composite gasket wherein the main or body portion consists of rubber or other similar elastic material, while the flat faces or surfaces of the gasket, and especially at the inner perimeter thereof, is composed of or provided with asbestos fiber, or like absorbent material, adapted to come into intimate relation with the water-glass or tube at points on opposite sides of the gasket, in such manner as to prevent the rubber portion of the gasket, intermediate of the two sides, from becoming displaced and flowing beyond the asbestos portions of the gasket and therefore obviating the difficulties heretofore encountered and as hereinabove enumerated.

The invention and its advantages will be more fully comprehended from a detailed description of the drawing, wherein the improved gasket is shown applied to a type of water-gage at present in use.

Figure 1 is a cross sectional view, in perspective, of my improved gasket.

Fig. 2 illustrates the application of my gasket to a water-gage; the stuffing-boxes and glands, as well as the improved gasket, being shown in cross-section.

In the particular exemplification of the invention, it is illustrated as applied to a type of water-gage employed on locomotive boilers, and comprises the main or body portion 5, which consists of rubber, or other suitable elastic material, made of dimensions suitable to the uses or purposes for which it is intended; the gasket being provided with the central aperture 6 which is adapted to receive the ends of the water-tube or glass shown at 7 in Fig. 2; the aperture being of such size as to permit the gasket to firmly engage with the glass or tube and form a water and steam-tight connection.

The opposite faces of the gasket are provided with rings or disks 8, 8 preferably of asbestos or other suitable absorbent and heat resisting material, which are preferably firmly cemented or intimately secured to the main or body portion so as to provide an integral unit or gasket. The rings or disks 8, 8 are adapted to extend to the inner perimeter of the gasket as shown in the drawing so as to bring the disk or ring into intimate relation with the water-glass or tube 7 in a manner similar to the rubber or body-portion 5 of the gasket.

The rings or disks 8, 8, which are preferably of substantial width and thickness, may be of similar diameter as the rubber or body-portion of the gasket and thus extend throughout the entire top and bottom surfaces thereof; or the disks or rings 8, 8 may be of smaller outer diameter, although of relative thickness and width, and forced into the circumferential grooves or kerfs of the body-portion, as shown in Fig. 1, where the body-portion 5 is provided with circumferential kerfs 9, 9 into which the asbestos or other fabric disks or rings 8, 8 are inserted and preferably cemented or otherwise properly secured in place so as to form an integral unit or gasket adapted to maintain the proper intimate relation of the various parts throughout the life of the gasket.

As previously stated, in gaskets intended for water-gages, it is advisable to employ rubber for the main or body-portion of the gasket because of its resiliency and elasticity, which adapts it to variations in the size of the water-tubes or glass and which is also adapted to the variations of heat and pressure in the water-gage as employed on steam boilers. With my improved construction, it is apparent that the gasket may have intimate relation with the water-glass or tube; and in the event that the body or rubber portion of the gasket, which is in contact with the glass, becomes softened, it will be prevented from running or becoming displaced lengthwise of the glass and across the open ends thereof, by the asbestos or fiber portions 8, 8; at the same time the asbestos portions 8—8 do not interfere with the initial compression of the gasket because of the intermediate rubber seat or portion which is disposed between the asbestos members 8—8 arranged at opposite ends of the gasket.

In water-gages of the class in question, because of the variations in the water-tubes or glass, it is necessary to provide the gage connections and stuffing-boxes with apertures or internal dimensions somewhat greater than the diameter of the glass or tube. By reason of such enlarged apertures, the gaskets must also serve the purpose of properly supporting the water-tube or glass at its ends in the stuffing-boxes, out of contact with the metal portions of the gage. As a result of the enlarged apertures, a clearance or space between the glass or tube and the metallic couplings and stuffing-boxes is provided, through which the softened rubber, especially under pressure, would readily find its way, unless proper means are provided to prevent such possibility. The rubber which may be displaced through pressure of the gland in the stuffing-box and the heat of the glass or tube will be effectively stopped and prevented from moving lengthwise of the water-tube or glass by the absorbent nature of the rings or portions 8, 8; while at the same time the asbestos rings or portions provide a suitable insulation for the main portion of the gasket against the hot water and steam.

In addition to preventing the displacement and flow of the rubber portion of the gasket, the asbestos portions or rings tend to maintain the entire quantity of rubber in proper relation, and enable all of the rubber to be maintained in place so that the full holding capacity of the gasket, against leakage, will always be obtained; as the asbestos portions or rings are unaffected by the great heat and the pressure necessary in securing the various parts of the gage together and to provide a water and steam-tight relation with the water-glass or tube. The asbestos or absorbent fibrous material 8, 8 of my improved gasket will absorb the moisture and prevent any discoloring fluid or moisture flowing lengthwise of the water-glass or tube.

As shown in Fig. 2, both ends of the water-gage are provided with similar stuffing-boxes and with similar gaskets whereby the water-tube or glass is maintained in place and water and steam-tight connections effected. In order to adapt my improved gasket to the various situations or positions, and in order to prevent the improper application of the gasket, as might be the case where repairs on the water-gage are made, I prefer to provide both surfaces or faces of the gasket with similar absorbent fibrous material portions or asbestos rings 8, 8, as shown in the drawing, thus obviating the necessity for any special care being used in the application of the gasket. At the same time, by providing an integral unit, as previously described, it is evident that misplacement of the asbestos rings or portions cannot take place, as would be the case where separate asbestos rings and rubber rings or members are employed. With my improved gasket, the displacement of the rubber under compression, and its loss by heat, whereby the volume of the rubber would be reduced, is prevented and therefore the resultant weakening of the gasket is obviated, with the result that a gasket is provided of greater longevity and superior effectiveness.

I have shown and described what I believe to be the simplest and best embodiment of my invention; having shown and described the improved gasket as especially applicable for use in connection with water-gages as employed on steam boilers; but it will be readily understood that the gasket may be modified in certain respects without, however, departing from the spirit of my invention, and that the gasket may be equally as well applied to other uses.

What I claim is:—

A gasket of the class described, comprising a ring of rubber of substantial thickness and width, the flat surfaces at opposite ends thereof being provided with circumferential kerfs disposed about the inner perimeter of the ring, and rings of absorbent, heat-resisting fibrous material of substantial width and thickness, embedded in said kerfs and firmly secured to said first mentioned ring so as to extend to the inner perimeter of the gasket, with a seat of rubber intermediate of the rings of fibrous material at both ends of the gasket.

GEORGE S. GARREN.

Witnesses:
P. W. RAYMOND,
W. A. BRANDT.